United States Patent [19]

Bailly

[11] 3,728,538

[45] Apr. 17, 1973

[54] APPARATUS FOR CORRECTING THE EFFECT OF VARIATION IN LOAD ON THE DIRECTION OF HEADLIGHT BEAMS OF VEHICLES

[75] Inventor: Francois Bailly, Neuilly-sur-Seine, France

[73] Assignee: Societe Anonyme Pour L'Equipment Electrique des Vehicules S.E.V. Marchal, Issy les Moulineaux, France

[22] Filed: July 27, 1971

[21] Appl. No.: 166,517

[30] Foreign Application Priority Data

July 31, 1970 France.......................... 7028356
Feb. 26, 1971 France..........................7106705

[52] U.S. Cl. ..........................240/7.1 LJ, 240/62.62
[51] Int. Cl. .............................................B60q 1/10
[58] Field of Search........................240/7.1 LJ, 61.2, 240/61.5, 61.8, 61.9, 62.6, 62.64, 62.2, 62.62

[56] References Cited

UNITED STATES PATENTS

| | | | |
|---|---|---|---|
| 3,316,397 | 4/1967 | Yssel.........................240/7.1 LJ |
| 3,370,162 | 2/1968 | Henry-Biabaud..............240/62.62 X |
| 1,324,852 | 12/1919 | Simpson et al. ..................240/62.62 |
| 3,614,416 | 10/1971 | Fleury ............................240/62.2 X |

*Primary Examiner*—Samuel S. Matthews
*Assistant Examiner*—Fred L. Braun
*Attorney*—Richard L. Johnston et al.

[57] ABSTRACT

A system or apparatus for correcting the effect of variation in load on the direction of headlight beams of vehicles whereby the position of the headlights is automatically varied in response to changes in distribution of load when the vehicle is empty, lightly loaded or heavily loaded, or during braking or acceleration.

7 Claims, 2 Drawing Figures

APPARATUS FOR CORRECTING THE EFFECT OF VARIATION IN LOAD ON THE DIRECTION OF HEADLIGHT BEAMS OF VEHICLES

BACKGROUND

It is well known that when an automobile vehicle is equipped with headlights which are fixed to the body, the adjusting of the height of the lighting beam axis is done for a given load of the vehicle, and that it is modified when the load of said vehicle varies or when the distribution of said load in the vehicle is modified. Especially, if the beams are adjusted when the vehicle is empty, or only slightly loaded, the presence of a significant load near the rear of the vehicle displaces upward the axis of the lighting beams, a situation which causes a blinding of the drivers of vehicles coming from the opposite direction; the same situation exists when the vehicle is subjected to an important acceleration.

OBJECTS

The object of the present invention is to offer a device which makes it possible to correct the angular displacement of the axes of the vehicle lights, so that the position of those axes with respect to the road on which said vehicle runs will be practically independent of the load of said vehicle, of the distribution of said load inside the vehicle, and of the accelerations or braking to which the vehicle is subjected.

BRIEF SUMMARY OF THE INVENTION

In accordance with the invention, a wheeled vehicle having headlights is provided with (a) means comprising transverse torsion bars adjacent the front and rear of said vehicle mounted for rotation in bearings supported by the body of said vehicle and rotatable in response to vertical movement of the wheel axles; (b) longitudinally disposed connecting means between said torsion bars operative to move longitudinally in response to rotational movement of said torsion bars and including resilient means adapted to be compressed or expanded longitudinally; (c) headlights rotatably mounted on said vehicle for up and down movement, and (d) actuating means connecting said headlights to said longitudinally disposed connecting means whereby changes in load distribution of said vehicle reflected on said longitudinally disposed connecting means are imparted to said hightlights so as to correct their positions with respect to a roadway.

DETAILED DESCRIPTION OF THE INVENTION

Figure 1:
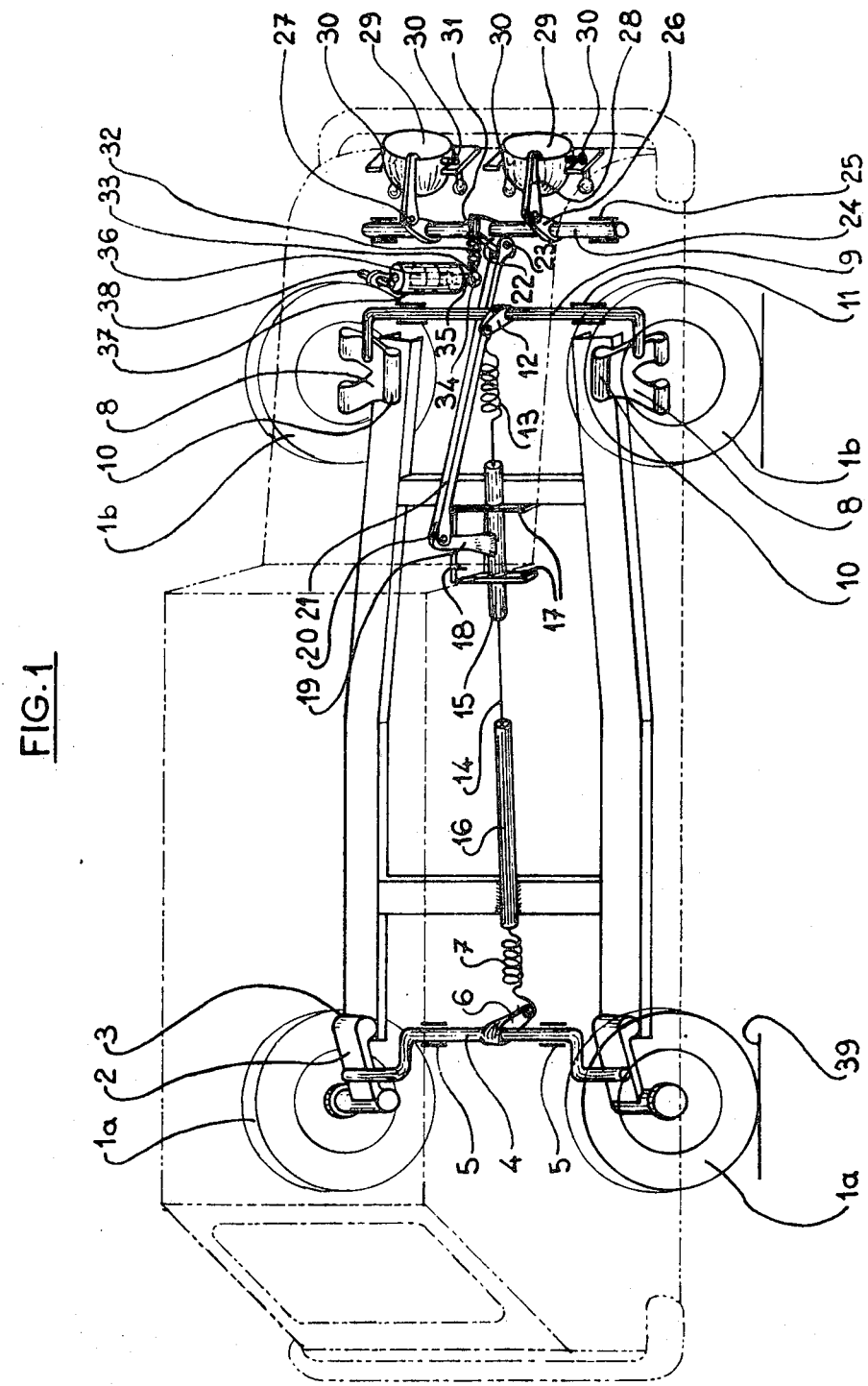

The present invention provides a new industrial product comprising a correcting device which insures, when the seat or level of the vehicle varies, under the action of a load variation, for example, or of speed variation, a stability of the position of the headlights of an automobile vehicle with respect to the running path of said vehicle, characterized by the fact that it includes, each one connected to one of the two stabilizing torsion bars placed in the transverse direction both at the front and at the rear of the vehicle, two small connecting rods, the free end of which is either directly or not, firmly connected to a spring, the two ends of the two aforementioned springs being connected with each other by means of a connecting member on which there is articulated the first end of a transmission arm, the second end of which is firmly connected to a small connecting rod connected to a free rotating shaft and carried by the vehicle in the transverse direction, said shaft carrying two control or governing arms each one of which is connected to a point of one of the highlights of the automobile vehicle, each headlight being firmly connected to the body in two other points which constitute an articulation around an axis parallel with the running path of the vehicle.

In a first preferred mode of operation, the connecting member which connects the two traction springs of the vehicle is a cable, preferably covered with a sheath, said cable being over part of its length, either solidary of, or replaced by, a slider capable of moving according to a translation motion inside a support which is fixed to the body, said slider itself being mechanically connected to the transmission arm of the device; the mechanical connection of the slider with the transmission arm is done through a connecting rod, said rod being welded by one of its ends in a point of the slider, and having, at its other end, a ball-and-socket joint which cooperates with one end of the transmission arm; the articulation of the transmission arm with the small connecting rod attached to the governing or driving shaft of the headlights motion is a ball-and-socket joint; the connection between the governing arm and headlight is done through a regulating screw which cooperates with a screw-nut fixed to said headlight, said regulating screw having at one end an articulation of the ball-and-socket type, which cooperates with the end of the corresponding governing arm.

The shaft governing the motion of the headlights is checked in its rotation motions by a damper or shock absorber; the connection between the headlight control shaft and the damper is done by means of a spring working by flexing or bending one of the ends of the spring being fixed to a small connecting rod mechanically attached to the control shaft, whereas the other end is fixed to a supporting rod connected to the movable piston of the damper by means of a ball-and-socket joint; the small connecting rod, which supports the spring working by flexing and which is fixed to the shaft controlling the motion of the headlights, is disposed in approximately the same plane, perpendicular to the axis of the governing shaft, as the small connecting rod, which insures the connection of the control shaft with the transmission arm.

In a second mode of operation, the small connecting rod which is connected to the rear torsion bar is not directly fixed to the corresponding spring, the connection between said small connecting rod and said spring being done by means of a cable which presents, for example, at least one curve, and said spring being placed between the cable and the connecting member properly speaking; in that case, the connecting member consists of a slider which is capable of moving in translation inside a support which is fixed to the body of the car, said slider itself being mechanically connected to the transmission arm of the device. Said arrangement is made practically necessary when the cable presents at least one curve because said cable then presents important friction points in its sheath, and should the spring corresponding to the rear torsion bar be placed near said torsion bar, the friction motions of the cable would affect the response of the device.

It must be noted that, in the first form of construction of the device according to the present invention, the two springs placed at the two ends of the longitudinal connecting member are, each one of them, placed near one of the transverse torsion bars of the vehicle; said arrangement makes it possible perfectly to absorb, through the play of the springs, all of the vibrations of high frequency resulting from the passing of the wheels over imperfections or deformations of the roadway. The device according to the present invention, therefore, does not entail any vibration of the light beam axes around their predetermined position.

On the other hand, when there is a modification of the posture of the vehicle, there occurs a torsion of one or the other at least of the transverse torsion bars of the vehicle, which entails, by the intermediary of the small connecting rod or rods which correspond, a longitudinal displacement of the connecting member. It is evident that, in the case when said member is a cable, subjected at both of its ends to the actions of two traction springs of the device, said cable is subjected, when the vehicle is empty, to a pull sufficient to insure that during the motions of the torsion bars said cable will always be stretched. The longitudinal displacement of the cable insures the translation of the slider in its support and, through the connecting rod, the operation of the transmission shaft; said translation causes a motion of the small connecting rod which is located at the end of the transmission shaft and, consequently, a rotation of the headlight control shaft, a rotation which, by the virtue of the two control arms carried by said shaft, finally causes a rotation of the two headlights around the fixed axis parallel with the roadway and determined by the two fixation points of the headlight on the body, said fixations being provided for with ball-and-socket joints.

When the vehicle is subjected to a strong acceleration or braking action, the headlight control shaft is driven into rotation for a relatively short period of time; said rotation causes the flexing of the spring which is provided to perform the connection between the aforementioned governing shaft and the movable piston of the devices' damper. It is advantageously provided for to use a relatively hard damper, so that the displacement of the movable piston will take place only slowly, the result of which is that when a rotation of short duration is applied to the driving shaft, the movable piston does not have the time to be displaced over an appreciable distance, and the rotation of the control shaft only corresponds to a flexing of the spring inserted between the damper and said control shaft. Hence, there is a noticeably rapid return to the final position when the acceleration or the braking action to which the vehicle has been subjected is eliminated.

On the contrary, when the posture of the vehicle is modified by a variation in the load in the vehicle, or of the distribution of said load, there occurs a rotation of the control shaft of the headlights, and said rotation is maintained for a significant period of time. There results from this that, under the action of the recoil force exerted by the flexing spring on the movable piston of the damper, said movable piston moves in the damper until the flexing of the flexing spring is cancelled. In that case, from the new position of the movable piston, the flexing spring again can perform its function at the time of an acceleration or of a braking action, as indicated previously.

It has been observed, however, that the headlights thus maintained and operated at three points, two of which are fixed to the body, as indicated above, may vibrate when the fixation plane defined by the three points is shifted with respect to the center of gravity of the headlight; said vibration, in fact, results from the out-of-perpendicular assembling of such a headlight, and causes during the functioning of the device according to the present invention a displacement of the light beam projected by the headlight.

The present invention also provides an improvement which makes it possible to prevent such vibrations for the headlights mounted out-of-perpendicular with respect to the plane of fixation and, especially for headlights which constitute a relatively important volume complex, because of the dimensions of the casing or housing as well as those of the bracing parts inserted between said casing and the external lens or glass of the headlight.

The present invention, therefore, also has as its object the provision of a correcting device which insures, when the posture of the vehicle varies, for example, under the action of a load or speed variation, a stability free from vibrations for the position of the axes of the light beams of the headlights of an automobile vehicle, with respect to the roadway on which said vehicle runs, said headlights being such that they can be mounted out-of-vertical with respect to the plane defined by their three fixation points, said device including, connected each one to one of the two torsion bars having a stabilizing action and placed in a transverse direction to the front and to the rear of the vehicle, two small connecting rods, the free end of which is either directly or indirectly fixed to a spring, the two ends of the two aforementioned springs being connected together by a connecting member on which there is articulated the first end of a transmission arm, the second of which is fastened to a small connecting rod connected to a free rotating shaft and carried in the transverse direction by the body of the vehicle, characterized in that the transverse shaft is connected, either directly or indirectly, to a crankshaft which is driven into rotation, around an axle fastened to the body of the vehicle, said crankshaft having, in the zone of its rotation axle the profile of a cam on which a small disc comes to rest, the supporting action of the small disc on the cam being done under the action of a spring and the small disc havings axle connected to a platen fastened to the point of fixation of one of the headlights of the automobile, each projector being fastened to the body in two other points which define an articulation axis approximately parallel with the running path of the vehicle, said small disc carrying platen being free to rotate around a fixed axle.

In a preferred mode of carrying out this improvement, the axle of rotation of the small disc carrying platen is the axle of the crank's arm. The axle of the crank's arm carries one of the ends of a helix-shaped spring, the other end of which is fastened to the axle of the small disc, which rests on the cam of said crank's arm. The actuation of the crank's arm, from the transverse shaft movable around its axis is done by any suitable means, either by cable and spring, or by means of a small connecting rod with buttonhole. The small disc carrying platen presents the shape of a stirrup, the shaft of the small disc being maintained by its ends between the wings of the stirrup. The rotation shaft of the crank's arm is connected to the body through a U-shaped clamp which is disposed between the two wings of the aforementioned stirrup.

It should be understood that the connection between the crank's arm and the headlight being achieved by a support maintained under the action of an elastic force, the vibrations which might apply to the headlight mounted off the vertical with respect to its plane of fixation, will be absorbed by the spring which maintains the support of the small disc on the cam. Nevertheless, the motion of the headlight may be obtained because of the profile of the cam which causes a displacement of the small disc with respect to the body, and a rotation of the small disc carrying platen with respect to the axis of rotation of the crank.

The present invention finally has as its object, as a new industrial product, an automobile vehicle equipped with at least one headlight characterized in that it has a corrective device such as defined above.

In order to help understand the objects of the present invention, there will now be described, as illustration only and in no limitative manner, two embodiments illustrated in the attached drawing.

Figure 2:
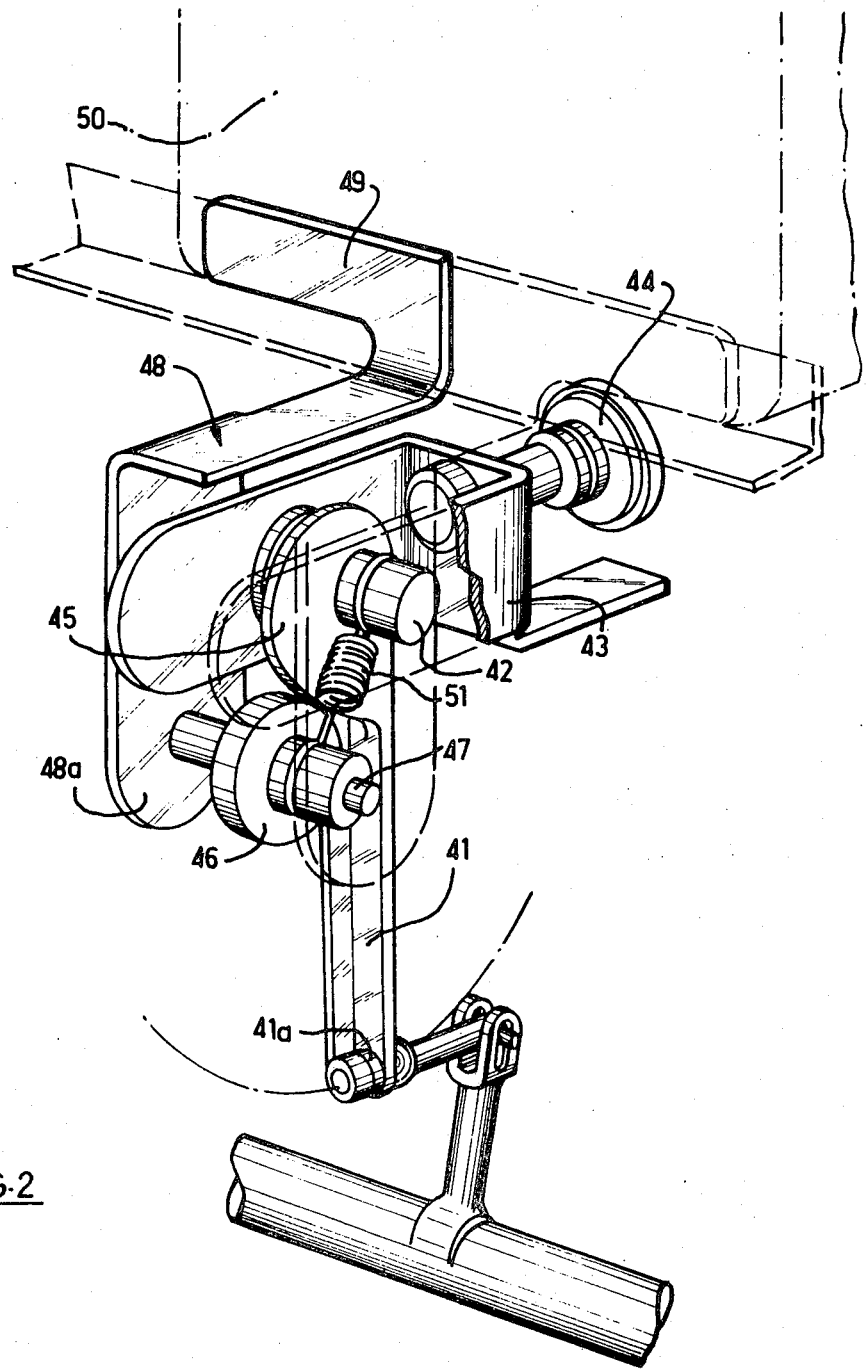

In the drawing:

FIG. 1 schematically represents, in perspective, the various elements of a device according to the present invention; and FIG. 2 represents, in perspective with parts broken away, an improved anti-vibration variation and more specifically, in this variation, the part which is inserted between the headlight, and the transverse shaft which controls the motion of said headlight.

With reference to FIG. 1, it can be seen that there have been designated by 1a the rear wheels of the vehicle, and by 1b the front wheels. The rear wheels 1a are mounted each one on an articulation arm 2 one end of which is fastened to the wheel axle and the other end of which is articulated on the body of the vehicle by an articulation designated by 3 in the drawing. Between the two arms 2 there is placed an anti-rolling torsion bar 4 carried by the body by means of two bearings 5. Torsion bar 4 is fastened to a small connecting rod 6, the free end of which is attached to a traction spring 7.

The two front wheels 1b of the vehicle are each one of them fastened to a suspension triangle 8, a torsion bar 9 being provided between the two suspension triangles 8. The suspension triangles 8 are articulated on the body by means of an articulation bar 10. Torsion bar 9 is supported by the body by means of two bearings 11. Bar 9 is fastened to a small connecting rod 12 the free end of which is attached to a traction spring 13. Springs 7 and 13 have their free ends attached together by means of a cable 14 and of a slider 15. Slider 15 is placed between spring 13 and cable 14, which thereby is disposed between slider 15 and spring 7. Cable 14 is placed inside a protection sheath 16 which plays no mechanical part. Slider 15 can move in translation inside a support formed by a U, the two wings 17 of which have borings through which slider 15 runs, and the core 18 of which is fastened to the body of the vehicle. Slider 15 has in its median zone, between the two wings 17, a connecting rod 19 welded on the slider 15, said rod having at its free end a ball and socket joint 20. A transmission shaft 21 is articulated on the connecting rod 19, by means of joint 20. The end of transmission arm 21, which is not connected to the connection rod 19, is connected to a small connecting rod 22 by means of a ball and socket joint 23.

Small connecting rod 22 is welded to a control shaft 24 disposed transversely in the vehicle, at the height or level of the headlights of said vehicle. Shaft 24 can freely rotate around its axis and it is supported at its ends by bearings 25 fastened to the body. Control shaft 24 carries two control arms 26, which are welded in a direction perpendicular to its axis, the two arms being parallel between them. The end of each arm 26 has a ball and socket joint 27 fastened by a screw 28 which cooperates with a receiving nut fastened to a headlight 29 of the vehicle. The receiving nut which cooperates with screw 28 is placed in the upper zone of headlight 29. Headlight 29 is fastened to the body by two screws 30, each one of which cooperates with a nut secured to headlight 29, the rear end of each screw having a ball and socket joint fastened to the body. The presence of screws 28 and 30 makes it possible to insure the initial adjusting of the direction of the axis of headlight 29.

In approximately the same plane as the small connecting rod 22, the control shaft 24 carries a small connecting rod 31 on which there is fitted a helix-shaped spring with contiguous coils 32, the other end of which is fitted over a supporting rod 33. The end of rod 33, which does not carry spring 32, is articulated by a ball and socket joint 34 on a shaft 35 which is fastened to the movable piston 36 of a damper 37, the external cylinder of which is connected to the body by means of an articulation shaft 38.

When the vehicle moves along its running path 39, and when wheels 1a or wheels 1b come upon imperfections in said path, such as pot-holes or ridges, the torsion bars 4 and 9 are subjected to rotations which cause a corresponding displacement of the small connecting rods 6 and 12. These motions of the small connecting rods 6 and 12, however, are relatively high frequency vibrations, and these vibrations are absorbed by the springs 7 and 13, so that cable 14 and slider 15 are not subjected to any displacement. Hence, these imperfections of the running path do not cause any modification of the position of the axes of the headlights 29.

When the vehicle is subjected to a strong acceleration, the front part of the vehicle becomes slightly raised, a situation which causes, through the play of torsion bars 9 and 4, and of springs 13 and 7, a displacement of cable 14 and of slider 15 from the front to the rear. Said motion causes, through the connecting rod 19, the transmission arm 21 and the small connecting rod 22, a rotation of shaft 24 in its bearings 25, and a forward motion of the control arms 26, so that the axes of the headlights 29 are carried downward, a motion which compensates for the lifting of the front part of the vehicle. The same phenomenon, in the opposite direction, takes place when the vehicle is subjected to a sudden and strong braking action. In those two cases, the rotation of shaft 24 causes the flexing of spring 32 because the damper 37 has been chosen hard enough for the movable piston 36 to move only slowly inside the body of the damper. The rigidity of damper 37 is predetermined so that the period of time which corresponds to an acceleration or to a braking action of the vehicle will cause only a very small displacement of the movable piston 36, and the rotation of shaft 24 is translated only by the flexing of spring 32.

When the vehicle is subjected to a load variation or to a variation in the distribution of said load, for example, when the trunk of the vehicle is loaded, there occurs a modification of the posture of the vehicle, and therefore an angular motion of the torsion bars 4 and 9 or of one of those bars only. As previously indicated, said rotation motion of bars 4 and 9 is translated by a rotation of the small connecting rods 6 and 12 and consequently by a rotation of the control shaft 24 and by a flexing of spring 32. However, said state being maintained for an important period of time, spring 32 exerts on the movable piston 36 of damper 38, a force which slowly causes the displacement of said movable piston until spring 32 is no longer subjected to any flexing. At that time, the device has come back to a position similar to the starting position, while having taken into account the variation of the posture which results from the modification in the load of the vehicle. It is obvious that an acceleration or a braking action, in that case, also causes the reactions which have previously been described, when the imperfections of the road cause no motion of the governing shaft 24.

It is important to emphasize the fact that the device according to the present invention makes it possible to correct the direction of the axes of the light beams of a vehicle, without any influence being exerted by the imperfections of the road, that phenomenon probably being partly due to the fact that springs 7 and 13 are placed near the transverse shaft which correspond to the axles of wheels 1a and 1b, respectively. There is also observed the fact that, at the time of an acceleration or of a braking action exerted on the vehicle, the response of the device according to the present invention is immediate, as is the case at the time of a modification in the load of the vehicle.

In FIG. 2 there has been represented a variation of a part of the device which has just been described. Said variation relates to the mechanism which is inserted between the transverse shaft controlling the headlights and each one of the headlights. For that variation, there will therefore not be described the various members which make it possible, starting with the motion of the torsion bars of the vehicle, to cause a rotation around its axis of the transverse shaft controlling the headlights, since these members are the same ones as in the device which has just been described.

Thus, with reference to FIG. 2, it may be seen that there has been designated by 41 an arm of a crank, the shaft of rotation of which 42, is carried by a U-shaped clamp 43 which is fastened by means of member 44 to the body of the vehicle. Crank arm 41 is controlled at its end 41a by the transverse shaft controlling the headlights, not represented in the drawing. Said crank arm 41 is capable of rotating around its shaft 42 through an angle of approximately 60°, the normal position of the crank arm 41 being approximately perpendicular to the median line of the U-shaped clamp 43 near its rotation shaft 42. Crank arm 41 carries cam 45 on which rests a free rotating small disc 46 on its axle 47. The axle 47 of small disc 46 is supported at both of its ends by the wings 48a (one of which is shown in phantom) which is designated by 48. Stirrup 48 is free to rotate around shaft 42 and is fastened to member 49 connected to the headlight at a point of the housing of same. Headlight 50 is further articulated around two points which are fastened to the body, these two points defining an articulation axis approximately parallel with the running path of the vehicle. The two points of articulation of headlight 50, with respect to the body, have not been shown in FIG. 2 but are similar to those described with respect to FIG. 1. Between shaft 42 and axle 47, a helix-shaped traction spring 51 which maintains small disc 46 on the surface of cam 45. Said cam surface is drawn in a manner such that the rotation of the crank arm 41 around shaft 42 will cause a modification of the distance between shafts 42 and 47 and consequently a rotation of stirrup 48 with respect to shaft 42 on which it is mounted.

Any rotation of the transverse shaft for the control of the headlight causes a corresponding rotation of the crank arm 41 around its shaft 42 and consequently, as indicated above, a rotation of stirrup 48 and of its platen 49 around shaft 42 fastened to the body. It is thus possible to control the headlight as a function of the motions of the transverse control shaft (shaft 24 in FIG. 1) as indicated in the previous description of FIG. 1. When the headlight shows a tendency to vibrate because of being out of perpendicular with respect to the plane of its three fixation points, two of which are fastened to the body and the third one of the platen 49, the vibrations are absorbed on spring 51 which insures the support of small disc 46 on the surface of cam 45. Such an assembly makes it possible to insure the stability of the light beams of the headlights while nevertheless making it possible to obtain the desired orientation as a function of the variations of posture of the vehicle.

It is understood that the above described modes of operation may be subjected to all desirable modifications without departing from the scope of the present invention. For example, when the connection between the small connecting rod 6 and the slider 15 is not in a straight line, that is, when cable 14 must present curves because of the shape of the vehicle's members, it is necessary to place spring 7 between cable 14 and slider 15, binding cable 14 to small connecting rod 6 so that the friction of cable 14 in its sheath 16 will not distort the correction made by the device according to the present invention.

The invention is hereby claimed as follows:

1. In a wheeled vehicle having headlights, the combination of:
    a. means comprising transverse torsion bars adjacent the front and rear of said vehicle mounted for rotation in bearings supported by the body of said vehicle and rotatable in response to vertical movement of the wheel axles;
    b. longtudinally disposed connecting means between said torsion bars operative to move longitudinally in response to rotational movement of said torsion bars and including resilient means ocmprising two springs adapted to be compressed or expanded longitudinally, comprising
    c. headlights rotatably mounted on said vehicle for up and down movement, and
    d. actuating means comprising a transverse free rotating control shaft connecting said headlights to said longitudinally disposed connecting means whereby changes in load distribution of said vehicle reflected on said longitudinally disposed connecting means are imparted to said headlights so as to correct their positions with respect to a roadway, said connecting means including two small connecting rods, each one of them connected to one of said torsion bars at the front and at the rear of the vehicle, said two small connecting rods each having a free end which is fastened to an end of one of said springs, the other two ends of said springs being connected together by means of a connecting member on which there is articulated the first end of a transmission arm, the second end of which is fastened to a small connecting rod connected to said transverse free rotating control shaft, said transverse shaft carrying two control arms each one of which is connected to one point of one of the headlights of the vehicle, each headlight being fastened to the body of the vehicle in two other points forming an articulation around an axis parallel with the running path of said vehicle, said connecting member which connects the two springs being a cable, said cable comprising, over a part of its length, a slider which moves in translation inside a support fastened to the body of said vehicle, said slider comprising mechanically linked to said transmission arm, said mechanical linkage of the slider with the transmission arm being effected by means of a connecting rod, said rod being welded at one of its ends to one point of the slider, and having at its other end a ball and socket joint, which cooperates with the first end of the transmission arm.

2. In a wheeled vehicle having headlights, the combination of:
   a. means comprising transverse torsion bars adjacent the front and rear of said vehicle mounted for rotation in bearings supported by the body of said vehicle and rotatable in response to vertical movement of the wheel axles;
   b. longitudinally disposed connecting means between said torsion bars operative to move longitudinally in response to rotational movement of said torsion bars and including resilient means comprising two springs adapted to be compressed or expanded longitudinally,
   c. headlights rotatably mounted on said vehicle for up and down movement, and
   d. actuating means comprising a transverse free rotating control shaft connecting said headlights to said longitudinally disposed connecting means whereby changes in load distribution of said vehicle reflected on said longitudinally disposed connecting means are imparted to said headlights so as to correct their positions with respect to a roadway, said connecting means including two small connecting rods, each one of them connected to one of said torsion bars at the front and at the rear of the vehicle, said two small connecting rods each having a free end which is fastened to an end of one of said springs, the other two ends of said springs being connected together by means of a connecting member on which there is articulated the first end of a transmission arm, the second end of which is fastened to a small connecting rod connected to said transverse free rotating control shaft, said transverse shaft carrying two control arms each one of which is connected to one point of one of the headlights of the vehicle, each headlight being fastened to the body of the vehicle in two other points forming an articulation around an axis parallel with the running path of said vehicle, the motion of said transverse control shaft being controlled by a damper, and the connection between said control shaft and the damper being effected by means of a spring which works by flexing, one of the ends of said last mentioned spring being fastened to a small connecting rod mechanically connected to said transverse control shaft and the other end being fastened to a supporting rod connected by means of a ball and socket joint to a movable piston in the damper.

3. A device as claimed in claim 2 wherein the small connecting rod which supports the spring working by flexing, and which is fastened to the transverse shaft controlling the movement of the headlights is placed in approximately the same plane, perpendicular to the axis of said transverse control shaft, as the small connecting rod which connects said transverse shaft with the transmission arm.

4. In a wheeled vehicle having headlights, the combination of:
   a. means comprising transverse torsion bars adjacent the front and rear of said vehicle mounted for rotation in bearings supported by the body of said vehicle and rotatable in response to vertical movement of the wheel axles;
   b. longitudinally disposed connecting means between said torsion bars operative to move longitudinally in response to rotational movement of said torsion bars and including resilient means comprising two springs adapted to be compressed or expanded longitudinally,
   c. headlights rotatably mounted on said vehicle for up and down movement, and
   d. actuating means comprising a transverse free rotating control shaft connecting said headlights to said longitudinally disposed connecting means whereby changes in load distribution of said vehicle reflected on said longitudinally disposed connecting means are imparted to said headlights so as to correct their positions with respect to a roadway, said connecting means including two small connecting rods, each one of them connected to one of said torsion bars at the front and at the rear of the vehicle, said two small connecting rods each having a free end which is fastened to an end of one of said springs, the other two ends of said springs being connected together by means of a connecting member on which there is articulated the first end of a transmission arm, the second end of which is fastened to a small connecting rod connected to said transverse free rotating control shaft, the transverse control shaft being connected to a crank arm rotatable about a shaft which is fastened to the body of the vehicle, said crank arm carrying in the zone of its rotation shaft a cam surface which engages a small disc, the engaging action of the small disc with the cam being achieved under the action of a spring, and the small disc having an axle connected to a platen which is fastened to the headlights of the vehicle, each headlight being fastened to the body of the vehicle in two other points which define an articulation approximately parallel with the running path of the vehicle, and said platen being freely rotatable around the shaft of said crank arm.

5. A device as claimed in claim 4 wherein the shaft of the crank arm is connected to one of the ends of said last mentioned spring, the other end of which is fastened to the axle of the small disc which is engaged by the cam of said crank arm.

6. A device as claimed in claim 4 wherein the small disc carrying platen presents the shape of a stirrup, the axle of the small disc being maintained by its ends between the wings of said stirrup, and the crank arm being placed between the two wings of said stirrup.

7. A device as claimed in claim 6 wherein the shaft of the crank arm is connected to the body of the vehicle by means of a U-shaped clamp, which is located between the two wings of the small disc supporting stirrup.

* * * * *